United States Patent [19]  [11]  4,265,720
Winstel  [45]  May 5, 1981

[54] STORAGE MATERIAL FOR HYDROGEN
[75] Inventor: Guenter Winstel, Ottobrunn, Fed. Rep. of Germany
[73] Assignee: Siemens Aktiengesellschaft, Berlin & Munich, Fed. Rep. of Germany
[21] Appl. No.: 99,590
[22] Filed: Dec. 3, 1979
[30] Foreign Application Priority Data
Dec. 21, 1978 [DE] Fed. Rep. of Germany ....... 2855413
[51] Int. Cl.$^3$ ........................... C25B 1/02; C25B 9/00
[52] U.S. Cl. .................................... 204/129; 704/192; 704/291
[58] Field of Search ........................ 204/291, 129, 192
[56] References Cited
U.S. PATENT DOCUMENTS
3,852,175  12/1974  Hoekje ................................ 204/291
FOREIGN PATENT DOCUMENTS
2203123  7/1973  Fed. Rep. of Germany ........ 252/181.1

OTHER PUBLICATIONS
Neumüller, Rompps Chemie Lexikon, 7th Ed., p. 2485.
J. I. Pankove et al., Applied Physics Letters, vol. 32, No. 7, pp. 439–441, 1978.

Primary Examiner—R. L. Andrews
Attorney, Agent, or Firm—Hill, Van Santen, Steadman, Chiara & Simpson

[57] ABSTRACT

A storage body composed of a silicon material, such as amorphous or finely crystalline silicon, is charged, with hydrogen, for example by contact with a hydrogen-containing atmosphere under positive pressure while at a temperature below about 100° C. Such a body absorbs a relatively large amount of hydrogen and the so-absorbed hydrogen can be discharged by heating the body to temperatures above about 50° C. The storage body may comprise a relatively thin silicon layer on a substrate, such as a steel, quartz glass or the like plate and may be overcoated with a catalytically-active metal layer, such as a palladium layer.

18 Claims, 1 Drawing Figure

STORAGE MATERIAL FOR HYDROGEN

BACKGROUND OF THE INVENTION

1. Field of the Invention

The invention relates to storage of hydrogen and somewhat more particularly to a material for storing hydrogen and to a method of storing hydrogen.

2. Prior Art

Storage materials for hydrogen are known. For example, Römpps, *Chemie Lexikon*, 7th Edition, page 2485, discloses that palladium, a precious metal of the platinum group, is capable of storing hydrogen. Upon absorption of hydrogen, the palladium crystal lattice expands and upon heating to about 40° to 50° C., the so-expanded crystal lattice releases most of the hydrogen it absorbed. In addition to palladium, nickel and several related metal alloys display similar characteristics.

It is expected that in the future hydrogen will gain even greater importance as an energy source. However, to be useful as such, hydrogen must be storable in as small a volume as possible in order, for example, to be readily available to highly mobile consumers. In this regard, the weight (specific weight) of the storage device is an extremely important factor.

However, if palladium is used as a hydrogen storage device or material, its high cost and relatively high weight must be taken into account. Further, palladium is a relatively scarce element and thus is not readily available.

SUMMARY OF THE INVENTION

The invention provides a relatively inexpensive, easily produced material for storage of hydrogen and which has a relatively low specific weight and a relatively high hydrogen storage capacity.

In accordance with the principles of the invention, a body, such as a plate, a layer or some other suitable geometrically-configured body composed of a silicon material is utilized as a storage material for hydrogen. The silicon material exhibits a high affinity for hydrogen, apparently because of the free bonds which are present and such material can be amorphous or finely crystalline. The silicon material can be applied as a layer onto a substrate, for example composed of steel, quartz glass, glass or some other similar material. In a preferred embodiment, a thin layer of a catalytically active metal, such as palladium can be applied over the silicon layer for improved hydrogen absorption. A plurality of silicon coated (with or without a catalytically active metal layer thereon) plates or the like can be arranged in an enclosed pressure-resistant container for increased hydrogen storage. A select storage body composed of a silicon material is charged with hydrogen in one embodiment by contacting such body with a hydrogen-containing atmosphere under positive pressure, preferably in the range of about 5 to 200 atmospheric excess pressure units (kg/cm$^2$) and at a temperature below about 100° C. Charging can also be accomplished via electrolysis in an appropriate electrolytical means having a hydrogen-containing fluid therein and the storage body connected as a cathode, or in a glow-discharge or sputtering process within a hydrogen-containing atmosphere, with the storage body provided as a target.

DESCRIPTION OF THE PREFERRED EMBODIMENTS

Figure 1:
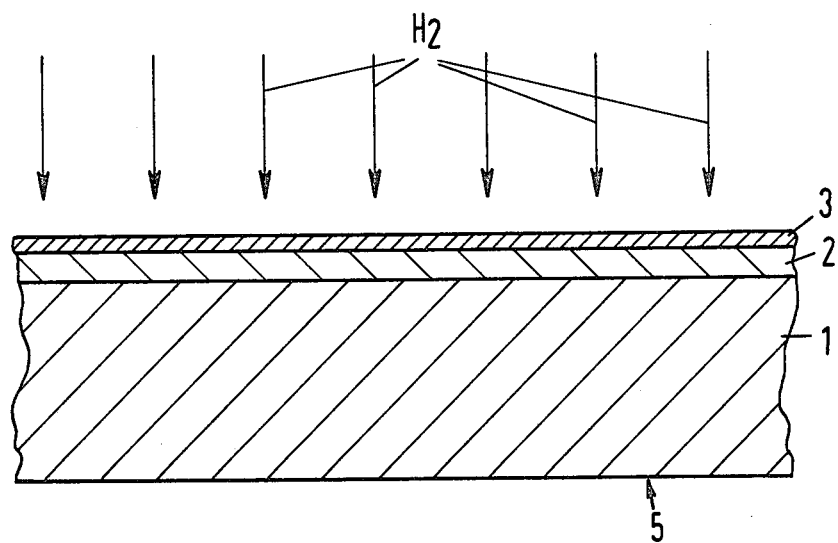
FIG. 1 is a partial elevated somewhat schematic view of a storage body being charged with hydrogen in accordance with an embodiment of the principles of the invention.

The invention provides a storage material for hydrogen and a method of storing hydrogen. The storage material or device of the invention is relatively easily and economically produced and exhibits a relatively low specific weight and a relatively high storage capacity.

In accordance with the principles of the invention, silicon is utilized as a storage material for hydrogen. Silicon material useful in the practice of the invention may range from amorphous silicon to fine-grained crystalline silicon.

It is known in semiconductor technology that amorphous silicon can absorb 18 to 50 atomic % of hydrogen [J. I. Pankove et al, *Applied Physics Letters*, Vol. 32, No. 7, pages 439–441 (1978)]. However, in that technology, such property is only of interest insofar as "dangling bonds" in silicon are rehydrogenatable by atomic hydrogen and the resultant electrical consequences.

The silicon material used in accordance with the principles of the invention comprises a practical form of a storage body capable of storing hydrogen. Preferably, such storage body is composed of amorphous silicon and is charged with a hydrogen-containing atmosphere under a positive pressure and at a temperature below about 100° C. Preferably, the pressure utilized for charging the storage body with hydrogen ranges from at least about 5 atmospheric excess pressure units (kg/cm$^2$) up to about 200 atmospheric excess pressure units (kg/cm$^2$).

The hydrogen storage body of the invention can take any desired form and preferably is in the form of a layer applied onto a carrier substrate, for example, composed of steel, quartz glass, glass or some similar material. A plurality of such substrates coated with a silicon layer can be operatively arranged in an enclosed, valve-controlled pressure-resistant container for increased hydrogen storage capacity.

In order to attain accelerated hydrogen absorption, a relatively thin layer of a catalytically active metal, such as palladium, can be coated onto a silicon surface layer of the storage body of the invention. Such catalytically active metal layer, which preferably is of a thickness of at least about 0.2 nm, when in contact with a hydrogen-containing atmosphere, generates atomic hydrogen which quickly penetrates this layer and is absorbed by the amorphous silicon or the fine-grained crystalline silicon which makes up the storage body and the so-absorbed hydrogen is stored therein.

The discharge of hydrogen from a charged storage body of the invention is relatively simple in that heating of the charged body to a temperature above about 50° C. is sufficient to release substantially all the hydrogen stored within the body. The so-released hydrogen can then be utilized as desired.

An alternative method of charging a storage body of the invention is via an electrolysis process utilizing a dilute alkali solution as a fluidic hydrogen-containing medium (electrolytic bath) with the hydrogen storage body connected as a cathode in an electrolytic means. Another alternative method of charging a storage body of the invention is via a sputtering-on process or a glow-discharge process wherein atomic hydrogen is generated within an operative chamber and brought into contact with a silicon body. In all of the various methods of charging hydrogen into a storage body of the invention, it is important to work in as low a temperature range as possible.

In order to attain a fast equalization between charging and discharging of hydrogen, it is preferably to utilize relatively thin (in the range of about 10 μm) amorphous silicon layers, each positioned on at least one surface of a carrier substrate, which can be in the form of plates and arranging such plates in a stacked-up parallel relation within a container, somewhat similar to conventional car battery plates or the like.

Referring now to the drawings, wherein like reference numerals designate like elements, FIG. 1 illustrates a partial view of an element or body 5 of such a battery-like arrangement. The body 5 is comprised of a plate-shaped carrier substrate 1, for example, composed of steel and having a thickness of about 0.5 mm. A layer 2, comprised of a silicon material, such as amorphous silicon, is applied onto at least one surface of the substrate 1 in a thickness of about 5 μm. In the embodiment here shown, a catalytically active metal layer 3, for example composed of palladium, is applied in a thickness of about 10 nm onto the surface of each silicon layer 2. The body 5 is charged with hydrogen, for example by exposing it to a hydrogen-containing atmosphere (schematically indicated by the arrows) under a positive pressure and at a temperature below about 100° C.

Figure 2:
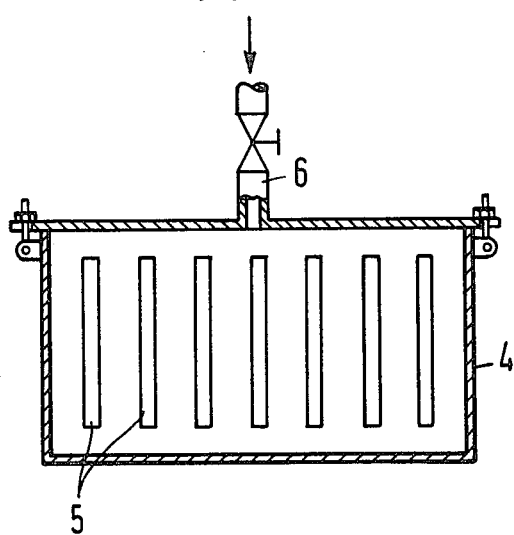
FIG. 2 is an elevated somewhat schematic view, partially in section, of a pressure-resistant container having a plurality of hydrogen storage bodies therein constructed in accordance with the principles of the invention.

FIG. 2 illustrates an exemplary pressure-resistant container 4 having a plurality of parallelly-arranged storaged bodies 5, each coated with a silicon layer and, optionally, with a catalytically active metal layer as described earlier. This arrangement enlarges the effective surface area for hydrogen storage and thus enlarges the volume of the stored hydrogen. An operative valve control means 6 is provided on the container 4 for charging and discharging of hydrogen therefrom.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim as my invention:

1. A method of storing hydrogen in a material which absorbs atomic hydrogen comprising:
providing a storage body comprised of a silicon material and contacting said body with a hydrogen-containing atmosphere under a positive pressure and at a temperature lower than about 100° C. whereby hydrogen is absorbed within said body and stored therein.

2. A method as defined in claim 1 wherein said positive pressure is at least 5 atmospheric excess pressure units ($kg/cm^2$).

3. A method as defined in claim 1 wherein said positive pressure ranges from about 5 atmospheric excess pressure units ($kg/cm^2$) to about 200 atomic excess pressure units ($kg/cm^2$).

4. A method as defined in claim 1 wherein sputtering conditions are established within said hydrogen-containing atmosphere.

5. A method as defined in claim 1 wherein a plurality of storage bodies are substantially simultaneously contacted with said hydrogen-containing atmosphere under said pressure and temperature conditions.

6. A method of storing hydrogen in a material which absorbs atomic hydrogen, comprising:
providing a fluidic hydrogen-containing medium in a confined space;
positioning a storage body comprised of a silicon material in contact with said medium; and
generating atomic hydrogen from said medium by passing electrical energy through said medium whereby atomic hydrogen is generated and contacts said storage body and is absorbed therein for storage.

7. A method as defined in claim 6 wherein said fluidic hydrogen-containing medium is an electrolytical bath composed of a relatively dilute alkali solution and said storage body is in electrical contact with said bath as an operative cathode.

8. A method as defined in claim 6 wherein said fluidic hydrogen-containing medium is a gaseous atmosphere and sputtering conditions are established within such atmosphere so as to generate atomic hydrogen whereby atomic hydrogen is generated and is absorbed by said body for storage.

9. A method as defined in claim 6 wherein a plurality of said storage bodies are positioned in contact with said fluidic hydrogen-containing medium.

10. A storage body as defined in claim 7 wherein said silicon material ranges from amorphous silicon to fine-grained crystalline silicon.

11. A storage body as defined in claim 10 wherein said silicon material is amorphous silicon.

12. A storage body as defined in claim 7 wherein each of said storage elements comprise a carrier substrate with a relatively thin layer of silicon material on at least one surface of such substrate.

13. A storage body as defined in claim 12 wherein said substrate is composed of a material selected from the group consisting of steel, quartz glass, glass, and a similar material and said relatively thin layer of silicon material has a thickness of about 5 μm.

14. A storage body as defined in claim 9 wherein catalytically active metal layer is composed of palladium.

15. A storage body as defined in claim 9 wherein catalytically active metal layer has a thickness of at least about 0.2 nm.

16. A storage body for hydrogen comprising an enclosed pressure-resistant valve-controlled container having a plurality of hydrogen storage elements arranged therein, each storage element being comprised of a silicon material.

17. A storage body as defined in claim 16 wherein said storage elements are plate-shaped and are arranged parallelly with one another inside said container.

18. A storage body as defined in claim 16 wherein said storage elements have a relative thin layer of a catalytically active metal on each silicon layer surface.

* * * * *